Feb. 8, 1938. H. W. ZIMMERMAN 2,107,558
GAUGING FIXTURE
Filed July 11, 1935 2 Sheets-Sheet 1
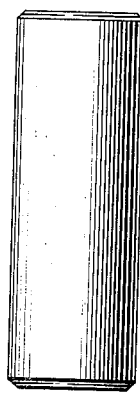
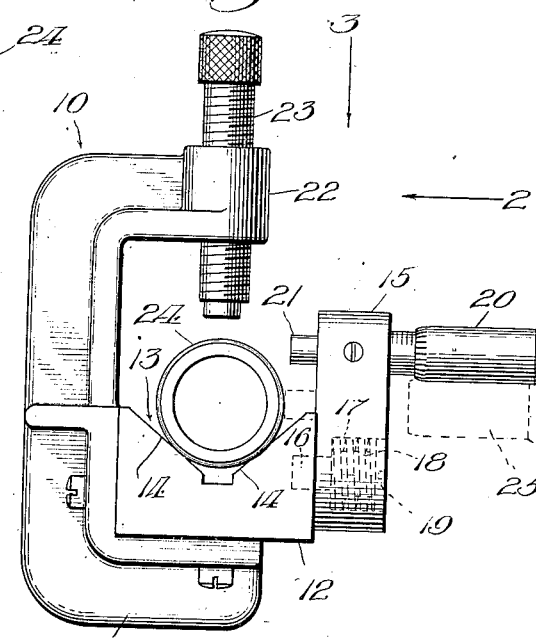
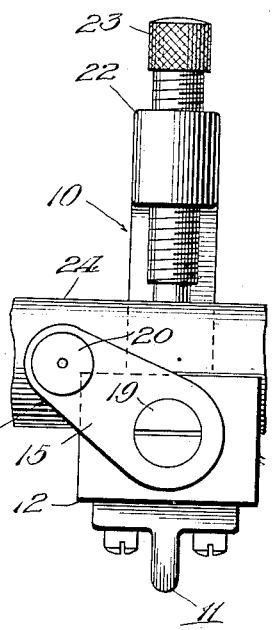
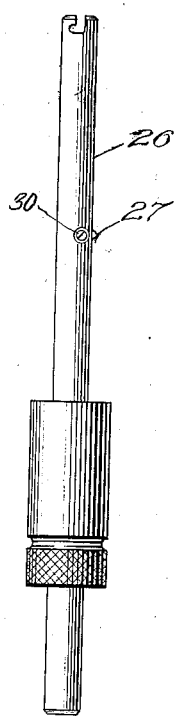
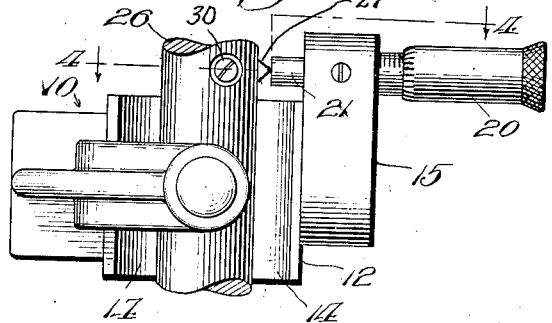
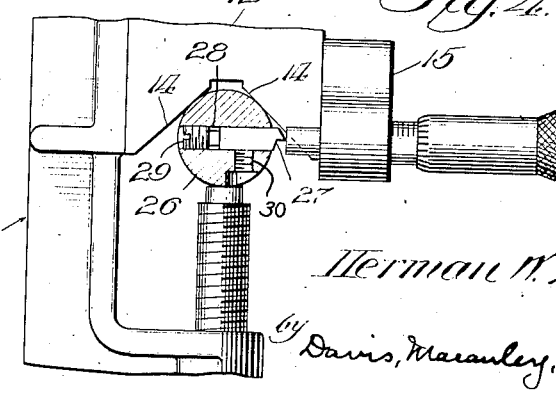
Inventor:
Herman W. Zimmerman

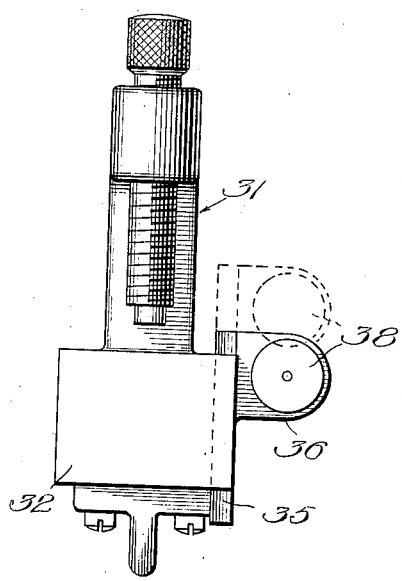
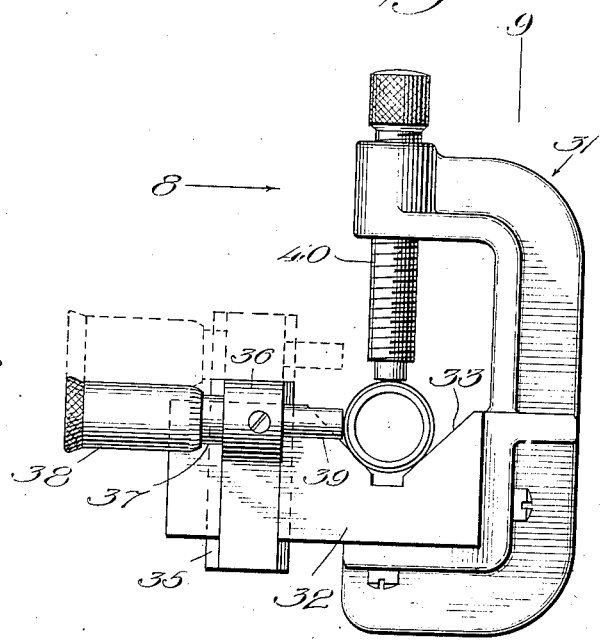
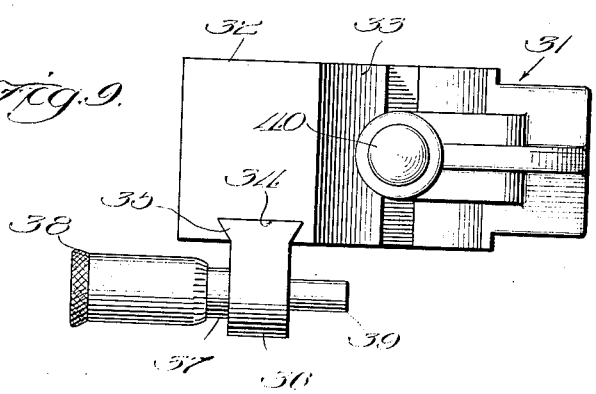

Patented Feb. 8, 1938

2,107,558

UNITED STATES PATENT OFFICE 2,107,558

GAUGING FIXTURE

Herman W. Zimmerman, Chicago, Ill., assignor to Automotive Maintenance Machinery Co., North Chicago, Ill., a corporation of Illinois Application July 11, 1935, Serial No. 30,820

5 Claims. (Cl. 33—185)

My invention relates generally to a gauging fixture for determining the setting of boring tools.

This application is a continuation in part of my copending application for a Method and machine for boring pin holes in pistons and connecting rods, Serial No. 9,989, filed March 8, 1935, and is concerned generally with the precision setting of the cutting elements of boring tools, preliminary to the boring of new holes or the reboring of previously bored holes to fit predetermined cylindrical parts, or parts having cylindrical portions.

One object of my invention is to devise a gauging fixture for determining the setting of the cutting blades of a boring tool by comparison with a master gauge or the part to be fitted, as distinguished from an actual measurement of the latter.

A further object is to devise a fixture of the character indicated in which the axes of the part to be fitted and of the boring tool are successively and mechanically located in identical relation to an adjustable member, thereby establishing a common zero position for the indicated elements and enabling the member to determine, with any desired tolerance, the setting of the cutting element of the tool by moving the latter to contact the member which is then occupying a position determined by the diameter of the part to be fitted.

A further object is to provide a fixture for carrying out the above method in which the device incorporates a V-shaped groove for successively holding the cylindrical part to be fitted and the boring bar with their axial centers in identical position, the spacing of the surface of the part from this center position being first determined and held, after which the boring bar is substituted for the part and the cutting blade is adjusted outwardly to the position determined by the surface of the part, with the usual allowance for tolerance.

These and further objects of my invention will be set forth in the following specification, reference being had to the accompanying drawings, and the novel means by which said objects are effectuated will be definitely pointed out in the claims.

In the drawings:

Fig. 1 is an elevation of my improved fixture showing a piston pin in position, as illustrative of the cylindrical part to be fitted.

Fig. 2 is a side view of the fixture, looking in the direction of the arrow 2 in Fig. 1, but showing the micrometer element swung to a position wherein the stem thereof may contact with the surface of the pin.

Fig. 3 is a plan view of the fixture, looking in the direction of the arrow 3 in Fig. 1, but showing the boring bar in position and the cutting blade of the bar adjusted outwardly to contact with the position of the micrometer stem, as determined by the piston pin when occupying the position shown in Figs. 1 and 2.

Fig. 4 is a section along the line 4—4 in Fig. 3, looking in the direction of the arrows and showing the manner in which the cutting blade of the bar is adjusted and held in the latter position.

Fig. 5 is an elevation of a typical piston pin which is illustrative generally of any cylindrical parts.

Fig. 6 is an elevation of a typical boring bar, the setting of whose cutting blade may be determined by my improved fixture.

Fig. 7 is a view corresponding to Fig. 1, but showing a modified form of fixture; and Figs. 8 and 9 are views looking in the direction of the arrows 8 and 9, respectively in Fig. 7.

As already indicated, the drawings illustrate a piston pin as generally indicative of a cylindrical part utilized to determine the setting of the cutting blade of the boring bar. It will be understood, however, that the use of my improved fixture is not limited to piston pins, but is concerned generally with cylindrical parts of whatever description and type, such as master plug gauges and the like, and irregularly shaped parts having cylindrical portions.

Referring to Figs. 1 to 4, inclusive, the numeral 10 designates the fixture which is generally U-shaped and one arm 11 of which supports a block 12. The working surface of this block is provided with a substantially V-shaped groove 13 which is defined by surfaces 14—14 that, in the present disclosure, are arranged at right angles to each other. However, this specific disposition of the groove surfaces is intended to be merely illustrative, as the essential conception involves a symmetrical disposition of the surfaces with respect to a plane which bisects the angle formed by the surfaces, so that the axial centers of all cylindrical parts, regardless of their diameters, which are rested in the groove will lie in this plane. The groove surfaces may therefore form angles other than a right angle with each other.

An arm 15 is pivoted upon one side face of the block to swing in a plane that is parallel to the bisecting plane of the block groove. This arm is swingable about a screw 16 which is threaded in the block 12, and a cavity 17 is provided in the arm for receiving a tension spring 18 that encircles the stem of the screw and is interposed between the head 19 thereof and the end of the cavity. By this construction, it is possible to maintain the arm 15 against the side face of the block with a definite pressure and since the opposing surfaces of the block 12 and the arm 15 are precisely machined, the swinging accuracy of the arm 15 with respect to the bisecting plane of the block groove is always maintained.

A micrometer 20 is mounted in the free end of the arm 15 with its stem 21 extending through the arm into proximity with the block groove. The micrometer is intended to be generally illustrative of any member that can be adjusted toward and away from the element then resting in the block groove, although the micrometer does possess special value because of its calibration and capacity for being set a few thousandths of an inch in either direction from the setting determined by the cylindrical part, in order to give the required tolerance. The other arm 22 of the fixture is provided with a clamping screw 23 which is employed to hold either the cylindrical part to be fitted or the boring bar in the groove of the block.

A typical piston pin 24 is illustrated in Fig. 5 and, as above indicated, this pin is to be generally understood as representative of any cylindrical part. In automotive repair and replacement service, for example, these pins come ready for use and are hardened and ground accurately to definite sizes. Such pins may therefore be employed as a medium for the setting of the blade in the boring bar. However, it will be understood that the dimensional accuracy of the part to be fitted is not important, since in the use of my improved fixture, the part is not actually measured. It is necessary that the part or portion be truly circular in cross section.

In determining the setting of the cutting blade, the piston pin is first rested in the block groove and clamped in position by the screw 23, as indicated in Fig. 1. The arm 15 is then swung to substantially the dotted position shown in Fig. 1, or the full line position shown in Fig. 2, designated by the numeral 25, in which position the axis of the micrometer stem 21 and the horizontal, transverse axis of the pin are aligned. The micrometer is then adjusted until the end of the stem 21 contacts the surface of the pin, care being taken to insure that the end of the stem and the surface of the pin are free from dirt, grease and foreign material in general. The arm 15 may then be swung to a clear position without disturbing the setting of the micrometer, after which the piston pin is removed.

In the use of my improved fixture, I show a boring bar 26 (see Fig. 6) which is provided with a single cutting blade 27 that is adjustable in a diametral hole 28 of the bar, the adjustment being effected by means of a screw 29, after which the blade is secured in the adjusted position by means of a lock screw 30. However, the fixture is not restricted to handling the particular bar shown, as other types of bars and methods of adjusting and holding the cutting blade may be employed.

The piston pin having been removed from the fixture and the setting of the micrometer noted, the boring bar 26 is then secured in the groove of the block 12, after which the preferred procedure is to swing the arm 15 until the micrometer stem 21 is in substantial alignment with the axis of the cutting blade 27. The blade is then adjusted outwardly until it almost touches the end of the stem 21, whereupon the stem is then moved until it touches the end of the blade. The boring bar is now rotated until the highest point on the blade tip is found, after which the blade is moved outwardly until the reading on the micrometer is slightly more or less than that determined by the piston pin, depending upon the fit desired. This setting will provide for fitting of the pin in the pin hole of the piston as determined, and it will be particularly noted that it has not been necessary to measure the diameter of the piston pin. Moreover, if the latter method were adapted, it would be more difficult to translate this dimension into a setting of the cutting blade, because of the fact that the latter projects from only one side of the boring bar.

By the use of the fixture 10, it is possible to set the cutting blade of the boring bar for any diameter of piston pin, or other cylindrical part, because the center of any of the pins or parts is always located in the bisecting plane of the block groove and the end of the micrometer stem 21 is always positively and accurately located with respect to this axis. The fixture is also capable of use in connection with boring bars employing more than one cutting blade, since the bar may be simply rotated to bring the blades successively into cooperative relation with the micrometer stem 21.

In Figs. 7 to 9, inclusive, there is illustrated a modified type of fixture 31 which is also generally U-shaped and one arm of which supports a block 32 having a V-shaped groove 33 whose defining surfaces are arranged similar to those of the groove 13.

In one end surface of the block 32 and offset from the groove 33, there is formed a groove 34 having preferably a dove-tailed, cross-sectional shape for receiving a correspondingly shaped portion 35 provided on a holder 36. The part 35 fits precisely in the groove 34 and so that the holder 36 is capable of a sliding movement relative to the block 32. The sleeve 37 of a micrometer 38 is securely held in the holder 36 in a position normal to the direction of movement thereof and the micrometer stem 39 projects beyond the holder into proximity with the block groove 33. Accordingly, the exposed end face of the stem 39 can be moved in a plane parallel to the bisecting plane of the groove and the same relation characterizes the end face of the stem 21 (see Fig. 1). The fixture 31 is also provided with a clamping screw 40 for the same purpose as noted in connection with the screw 23.

The use of this modification is the same as that noted in connection with the fixture 10, except that the micrometer 38 is slidably moved into determining relation with respect to the part to be fitted and the boring bar, respectively.

I claim:

1. A fixture for determining the setting of the cutting blade of a boring tool preliminary to boring a hole to fit the cylindrical portion of a predetermined part comprising in combination, a member having a substantially V-shaped groove adapted to successively engage said cylindrical portion and said boring tool, and a device adjustably mounted on the member so that a face thereof may be positioned to contact the surface of the portion when the same is engaged with the sides of said groove, the device being additionally shiftable on the member to move the face in a plane parallel to the plane which bisects the angle formed by the sides of the groove so as to contact the cutting blade of said boring tool when said tool is engaged with the sides of said groove, thereby determining the cutting position of the blade such that the hole bored thereby will fit the portion.

2. A fixture for determining the setting of the cutting blade of a boring tool preliminary to boring a hole to fit the cylindrical portion of a predetermined part comprising in combination, a member having a substantially V-shaped groove, a device slidably mounted on the member, and a micrometer mounted on the device so that the end face of its stem may be positioned to contact the surface of the portion when the same is engaged with the sides of said groove, the device being additionally shiftable on the member to move the end face of the micrometer stem in a plane parallel to the plane which bisects the angle formed by the sides of the groove so as to contact the cutting blade of said boring tool when said tool is engaged with the sides of said groove, thereby determining the cutting position of the blade such that the hole bored thereby will fit the portion.

3. A fixture for determining the setting of the cutting blade of a boring tool preliminary to boring a hole to fit the cylindrical portion of a predetermined part comprising in combination, a member having a substantially V-shaped groove, a device slidably mounted on the member by a dove-tail connection therewith, and a micrometer mounted on the device so that the end face of its stem may be positioned to contact the surface of the portion when the same is engaged with the sides of said groove, the device being additionally shiftable on the member to move the end face of the micrometer stem in a plane parallel to the plane which bisects the angle formed by the sides of the groove so as to contact the cutting blade of said boring tool when said tool is engaged with the sides of the groove, thereby determining the cutting position of the blade such that the hole bored thereby will fit the portion.

4. A fixture for determining the setting of the cutting blade of a boring tool preliminary to boring a hole to fit the cylindrical portion of a predetermined part comprising in combination, a member having a substantially V-shaped groove, and an adjustable device slidably mounted on the member so that a face thereof may be positioned to contact the surface of the portion when the same is engaged with the sides of said groove, the device being additionally shiftable on the member to move the face in a plane parallel to the plane which bisects the angle formed by the sides of the groove so as to contact the cutting blade of said boring tool when said tool is engaged with the sides of said groove, thereby determining the cutting position of the blade such that the hole bored thereby will fit the portion.

5. A fixture for determining the setting of the cutting blade of a boring tool preliminary to boring a hole to fit the cylindrical portion of a predetermined part comprising in combination, a member having a substantially V-shaped groove, an arm pivoted on the member, and a micrometer mounted on the arm so that the end face of its stem may be positioned to contact the surface of the portion when the same is engaged with the sides of said groove, the arm being additionally shiftable on the member to move the end face of the micrometer stem in a plane parallel to the plane which bisects the angle formed by the sides of the groove so as to contact the cutting blade of said boring tool when said tool is engaged with the sides of said groove, thereby determining the cutting position of the blade such that the hole bored thereby will fit the portion.

HERMAN W. ZIMMERMAN.